United States Patent [19]
Pritt

[11] Patent Number: 5,680,138
[45] Date of Patent: Oct. 21, 1997

[54] SYNTHETIC APERTURE RADAR SIMULATION

[75] Inventor: Mark D. Pritt, Walkersville, Md.

[73] Assignee: Lockheed Martin Corporation, Bethesda, Md.

[21] Appl. No.: 573,083

[22] Filed: Dec. 15, 1995

[51] Int. Cl.$^6$ .................................................. G01S 13/90
[52] U.S. Cl. .......................... 342/169; 342/25; 342/179; 434/2
[58] Field of Search ........................... 342/169, 25, 179, 342/197; 434/2

[56] References Cited

U.S. PATENT DOCUMENTS

| | | | |
|---|---|---|---|
| 5,192,208 | 3/1993 | Ferguson et al. | 342/169 |
| 5,353,030 | 10/1994 | Koch et al. | 342/169 |
| 5,473,746 | 12/1995 | Pritt et al. | 395/161 |
| 5,542,032 | 7/1996 | Pritt | 395/121 |

OTHER PUBLICATIONS

*Computer Graphics*, Hearn & Baker, pp. 289–295, Prentice-Hall of Englewood Cliffs, New Jersey (1986).
Pritt, "Fast Algorithm for the Rendering of Three-Dimensional Surfaces," Oct. 1993, Proceedings of SPIE, vol. 2073.

*Primary Examiner*—Daniel T. Pihulic
*Attorney, Agent, or Firm*—Lane Aitken & McCann

[57] ABSTRACT

In a simulated synthetic aperture radar SAR, a terrain elevation model is provided. A phase component of the simulated SAR data is computed by determining a distance between incremental terrain points and a simulated SAR platform modulo the wavelength. The amplitude component is computed in the following manner. The terrain elevation model is rotated about a vertical axis to present terrain strips extending perpendicular to the assumed direction of travel of the SAR platform. Points distributed along the terrain strips are projected into an illumination plane perpendicular to the assumed SAR signal and into an image plane perpendicular to the illumination plane. Brightness values and areas in shadow from the simulated SAR signal are determined by the projection into the illumination plane and brightness values are accumulated into an accumulation register corresponding to incremental pixel areas of the image plane by interpolating the brightness of illumination values in accordance with the incremental pixel areas of the image plane.

7 Claims, 8 Drawing Sheets

SYNTHETIC APERTURE RADAR SIMULATION

This invention relates to synthetic aperture radar (SAR) simulation and more particularly to a system which will produce a set of data in pixel form which will represent image data that would be provided by an SAR radar system from a presumed or known terrain.

BACKGROUND OF THE INVENTION

In an SAR system, a sensor platform emits a chirped radar signal as it moves parallel to the terrain surface in an aircraft or satellite, for example. The time delays of the radar returns to the platform are proportional to the distance of the terrain to the platform. By appropriately processing these returns, an image of the terrain can be produced. The advantage of SAR is that unlike optical systems, the image may be formed in the presence of darkness, cloud cover or smoke. SAR images, however, exhibit a few unusual characteristics that are not present in optical images. The most well known effect is the layover effect in which tall objects like mountains appear to be laid over in the image. This effect occurs because the top of the tall object will be closer to the SAR platform than its base. A second characteristic of the SAR image is called the speckle effect which is due to coherent averaging of radar phase returns and which make the SAR image appear speckled.

A large number of techniques have been developed for exploiting SAR imagery, such as image registration, coherent change detection, terrain mapping by means of interferometric SAR, or stereoscopy, image segmentation, and automatic target recognition. Moreover, new algorithms for exploiting SAR imagery continue to be developed and there is a need for generating simulated SAR images in order to be able to test and calibrate the SAR algorithms. The SAR simulator would also be useful for enhancing other image software, such as XPatch, which is an algorithm developed by Wright Laboratories and generates radar signatures from CAD models. For example, XPatch is capable of generating a radar signature of an object, but in the simulation, the object appears to be floating in space. By using this algorithm in combination with an SAR image simulator, one would be enabled to generate a complete and authentic signature of the object and its surrounding environment, such as, for example, a tank sitting on the surrounding terrain rather than floating in space.

The most important use of an SAR simulator is to produce imagery for validating and quantifying accuracy of SAR exploitation algorithms. This is an important application since ground truth data is difficult or impossible to obtain.

SUMMARY OF THE INVENTION

In accordance with the invention, data representing a presumed or known terrain is provided in the form of a pixel based digital elevation model. This data is first rotated about a vertical axis to align the data with the direction of motion of the presumed SAR platform with respect to the terrain and the data is then projected into an illumination plane which is a plane perpendicular to the direction of the radar signals applied to the terrain from the SAR platform. The surface points are then projected into the image plane which is perpendicular to the illumination plane and provides in pixel form data representing the brightness of the illumination of the surface as would be detected by the SAR platform. The projection of the brightness data into the image plane requires interpolation. In addition, the fact that portions of the surface terrain will be blocked from the platform by being on the backside of tall objects relative to the platform has to be taken into account. The projection of the data to the image plane will faithfully reproduce the layover effect which is characteristic of SAR images.

SAR image data are complex valued in that they have two components, an amplitude component representing the brightness of the illumination and a phase component which varies with the distance of the terrain point being imaged from the platform along the slant angle. The phase component of the complex value in the simulation is computed in a straightforward manner from the distance from the sensor to the terrain point modulo the wavelength. Speckle effects can be added to the simulated amplitude component by means of a standard speckle noise generator. Random phase shifts can be added to the phase component to simulate surface effects, sensor noise, and atmospheric effects, etc.

DESCRIPTION OF THE PREFERRED EMBODIMENTS

Figure 1:
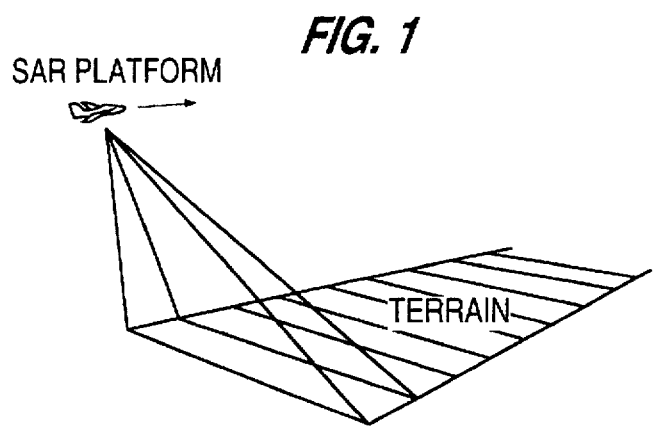
FIG. 1-3 illustrate how an SAR radar system works to obtain data representing terrain being transversed by the SAR radar signal.
Figure 2:
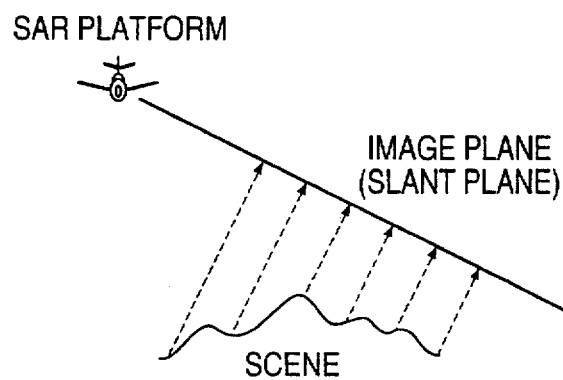
Figure 3:
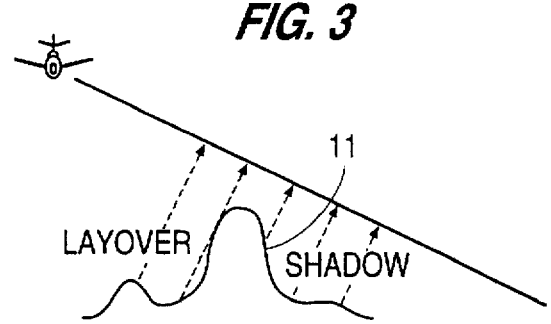

As shown in FIG. 1, in a synthetic aperture radar system, the SAR platform in an aircraft or a satellite moves in a horizontal path parallel to the terrain from which the synthetic aperture radar is obtaining an image. The synthetic aperture radar emits chirped signals and receives reflected signals back from the terrain and these signals are converted into values corresponding to the reflection from terrain strips perpendicular to the direction of motion of the aircraft. As the aircraft moves along, data from additional strips is obtained thus to synthetically simulate a large radar aperture for the entire terrain being imaged. As shown in FIG. 2, the signal is sent toward the terrain along a slant plane and the time of travel of the trip signal from the platform to the point at which the signal's reflection will indicate the distance along the slant plane that the reflecting point is from the SAR platform. The signals reflected from each successive points distributed along each strip are accumulated as pixels, each pixel representing a different increment of a strip of the image, in an image plane which is parallel to the direction of the radar beam transmitted to the surface. The projection of the points into the image plane is shown in FIG. 2. When the terrain includes a tall object as shown in FIG. 3, the portion 11 of the tall object will not receive the radar signal and therefore will be in a shadow and, accordingly, the received radar signal data will not have any values representing the portion in the shadow. However, the radar signal will illuminate portions of the tall object on the proximal side of the tall object. These portions of the tall object, while being hidden from view from a viewer looking at the surface from the image plane, are nevertheless represented in the SAR signal and images of these "hidden" portions are provided in the pixel data. This effect is called a layover effect as the image of the portion of the terrain which would normally be hidden from view from the perspective of the viewing plane makes the tall objects appear to be laid over in the SAR image. The SAR signals received by the platform have a brightness value representing the brightness of the received signal and also a phase value which corresponds to the distance of the image point from the platform modulo the wavelength or, in other words, the difference between the distance and the nearest integral multiple of the wavelength to the point producing the reflected signal.

The purpose of the present invention is to produce a simulated set of data which would be produced by an SAR from a selected terrain which is represented by a terrain elevation model. The terrain's elevation module represents the elevation of each terrain point as a digital value distributed over an XY grid, in other words, representing each terrain point elevation as a pixel. The first step of the applicant's simulation process is to provide such a terrain elevation model.

Figure 4:
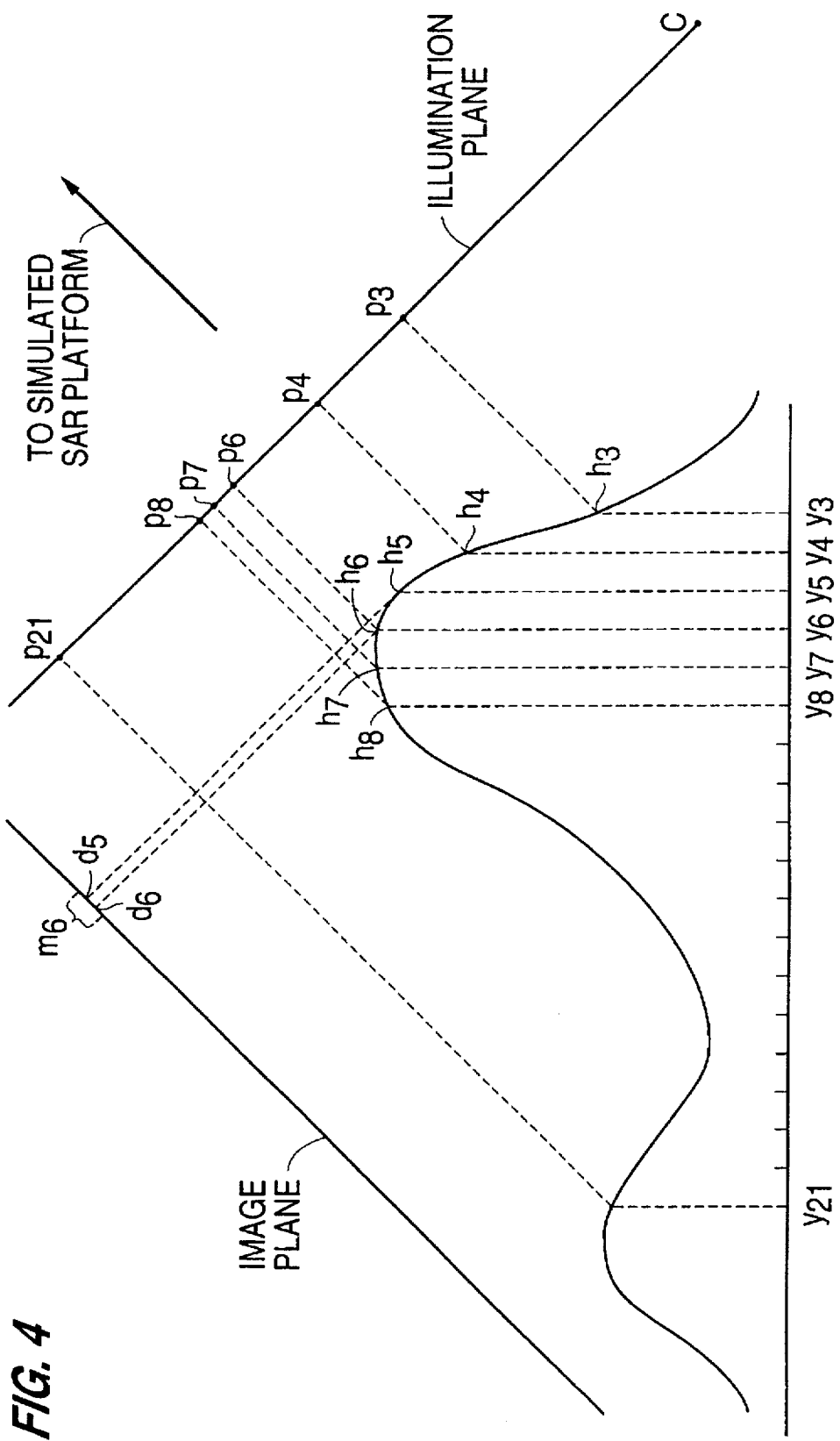
FIG. 4 illustrates how the system of the invention projects points in the illumination plane and the image plane.
Figure 5:
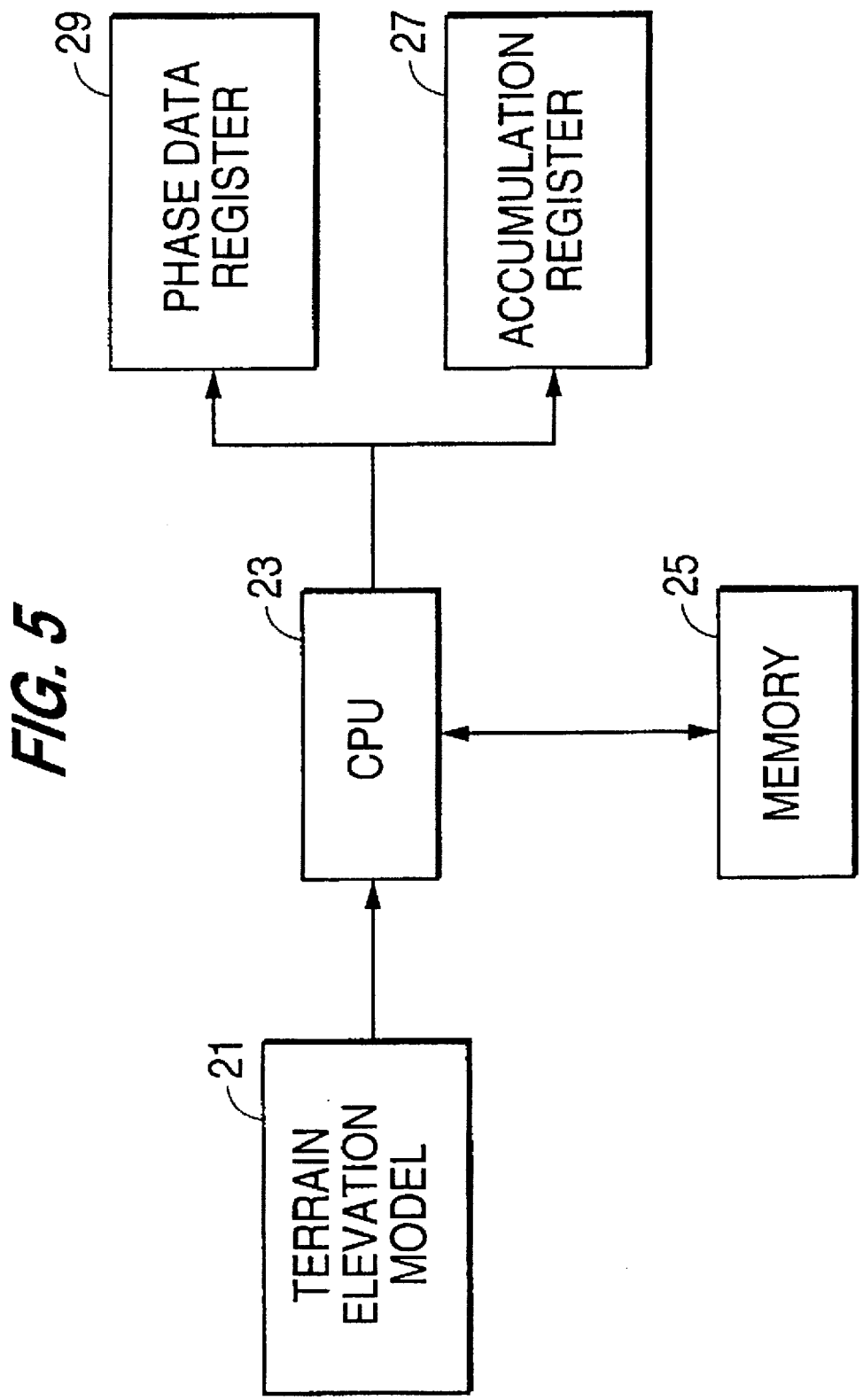
FIG. 5 is a block diagram illustrating the hardware of the system of the present invention.

To achieve the simulation, an image plane into which the pixels of the SAR image will be formed is assumed and in addition, an illumination plane which is perpendicular to the imaging plane is assumed as shown in FIG. 4. The hardware of the system of the present invention is schematically illustrated as shown in FIG. 5. As shown in FIG. 5, a terrain elevation model 21 representing elevation values of terrain increments distributed over an XY grid and thus representing the elevation in pixel form is received by a central processing unit 23 which coacts with a memory 25, a brightness component accumulation register 27, and a phase component register 29. The brightness accumulation register is designed to store pixels corresponding to terrain increments and is intended to store a brightness value for each terrain increment corresponding to the SAR received signal brightness component that would be generated by the simulated SAR platform. The phase components of the SAR received signal are computed and stored in the phase component register 29.

In accordance with the invention, the phase component of the complex signal is computed simply by generating a value equal to the difference between the distance of the platform from the pixel area being represented and subtracting from that distance the nearest integral multiple of the wavelength less than the distance. This difference will then represent the phase component of the simulated SAR value. The CPU 23 which computes the phase values stores the phase values in the phase component register 29.

The other component of the SAR value depends upon the brightness of the illumination of the surface and it also has to simulate the layover effect and the shadow effect. To determine brightness and the shadow effect and to eliminate aliasing at the edge of the shadow effect, the illumination plane is used. In accordance with the invention, each elevation point on the terrain is projected into the illumination plane as shown in FIG. 4 and is also projected into the imaging plane. As shown in FIG. 4, the incremental points $y_3$ through $y_{21}$ are distributed along a y axis which is parallel to horizontal extending along the terrain strip being simulated from the current position of the SAR platform. The elevation points $h_3$ through $h_{21}$ on the simulated terrain itself are shown projected vertically from the points $y_3$ through $y_{21}$, respectively. The points $h_3$ through $h_{21}$ are projected orthogonally into the illumination plane as points $p_3$ through $p_{21}$. The value of the points $p_3$ through $p_{21}$ are determined by the distance from an arbitrary point aligned with the terrain strip in the illumination plane, such as the origin point 0 in FIG. 4. It will be noted that the illumination plane is perpendicular to the direction from which the terrain is illuminated by the SAR radar signal. If the terrain surface is oblique to the illumination plane, the projection of the points into the illumination plane will be close together, such as the points $p_6$, $p_7$ and $p_8$. On the other hand, if the terrain faces the illumination plane, the projection of the points from the terrain surface will be spaced relatively wide apart in the illumination plane, such as the points $p_3$ and $p_4$. The more the surface faces towards the illumination plane, the brighter will be the illumination of the terrain and the more oblique the surface is to the illumination plane, the dimmer will be the illumination. To determine the brightness of illumination for the SAR data real component, the separation of the points in the illumination plane is calculated and the brightness of illumination, represented by the character "S", is determined to be proportional to the difference in this spacing. These brightness of illumination values are then projected into the image plane and are interpolated and accumulated in the pixels represented by the accumulation array in accordance with where the points project into the image plane. It will be noted that the projection of the points into the image plane and into the illumination plane is monotonic in that in the illumination plane, the farther the point on the surface is from the SAR platform, the higher up the projected point will be found on the illumination plane into which it is projected and vice versa in the image plane. If the terrain were perfectly flat, then the points of the terrain would project would be uniformly distributed in the image plane. However, because there is a variation in the elevation of the terrain, the position of the projection of each point in the image plane varies and the projection of the terrain points into the image plane does not align with the pixels of the image plane. This means that the brightness values being projected in the image plane must be interpolated so that the proper share of brightness from each terrain segment is accumulated in each pixel. In the preferred specific embodiment of the invention, the interpolation uses a simplified version of a shading technique similar to the well known Gouraud shading technique. In the simplification, it is assumed that the shades of neighboring surface points at each projection are the same. The Gouraud shading technique is described in the text by Hearn and Baker entitled "Computer Graphics" published by Prentice-Hall of Englewood Cliffs, N.J. in 1986. The specific description of this technique is found on pages 289 and 290.

The accumulation register 27 is organized in pixels representing an image of the terrain surface viewed from the perspective of the image plane and brightness values are accumulated into storage locations of the accumulation register to represent the brightness component of the SAR simulated data as pixels. The projection of the brightness values may be thought of intuitively as projecting the incremental terrain segments extending between the elevation points in the terrain into the image plane. Thus, the interpolated brightness accumulated into each pixel from each incremental strip is equal to the product of the brightness of illumination value S for that strip and the distance that the projected incremental strip overlaps a pixel area in the image plane.

Figure 6:
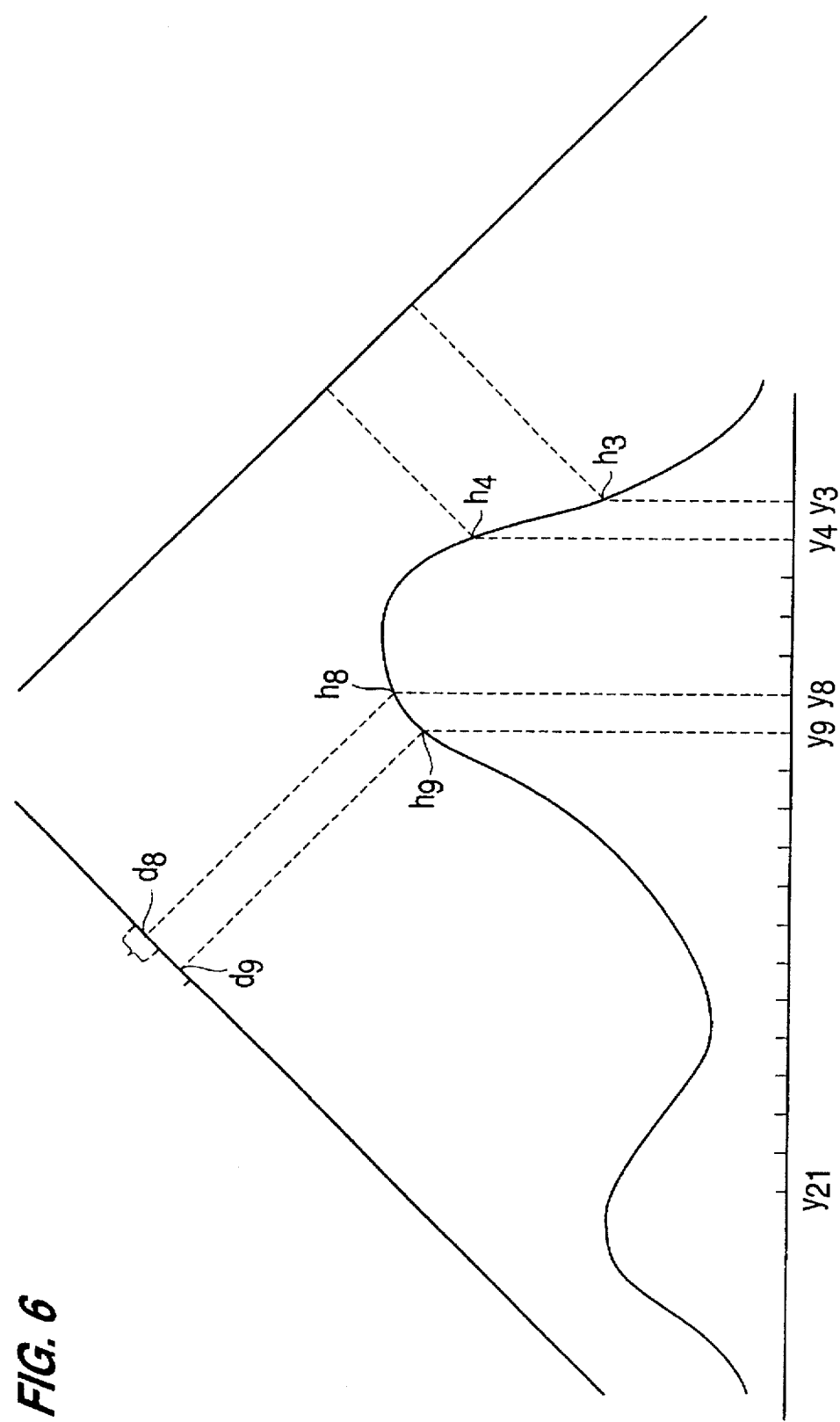
FIG. 6 illustrates how the system handles projection of a terrain segment into more than one pixel in the image plane.

Thus, if adjacent terrain points projected into the image plane fall into the same pixel area, such as points $d_5$ and $d_6$ in FIG. 4 falling in pixel area $m_6$, then the brightness accumulated in the pixel from the terrain increment between the points is determined by the product of the distance between the two points, e.g., $d_5-d_4$, times the brightness of illumination value S. If adjacent points are projected into different pixel areas, such as the points $d_8$ and $d_9$ as shown in FIG. 6, then the value is accumulated for each pixel is the brightness of illumination value S times the length of the overlap of the projected terrain segment with each pixel area. As shown in FIG. 6, part of the projected terrain increment between $d_8$ and $d_9$ falls into the pixel area $m_8$ into which the point $d_8$ projects and part of the projected terrain segment between $d_8$ and $d_9$ falls into the pixel area $m_9$ into which the point $d_9$ projects. The brightness accumulated into the pixel for pixel area $m_8$ is the product of the brightness of illumination S times the distance between $d_8$ and the boundary between $m_8$ and $m_9$ and the brightness S accumulated into the pixel for pixel area $m_9$ is the product of the brightness of illumination S times the distance between $d_9$ and the boundary between $m_8$ and $m_9$. To simplify the calculations, the boundaries between the pixels are represented by successive integers and the positions of points between pixel boundaries will accordingly be represented by a fraction.

In a case in which the projected terrain increment overlaps more than two pixel areas in the image plane, the brightness values accumulated in the pixels at the edge of the overlap are computed in the same manner as described above with reference to FIG. 6 and the pixels in the middle of the overlapping segment have brightnesses accumulated equal to the brightness of illumination S times the pixel width. Since the pixel area boundaries are defined by integers, each pixel will have a width of 1. Accordingly, the brightness(es) accumulated in the middle pixel(s) is simply the brightness of illumination value S.

Figure 7:
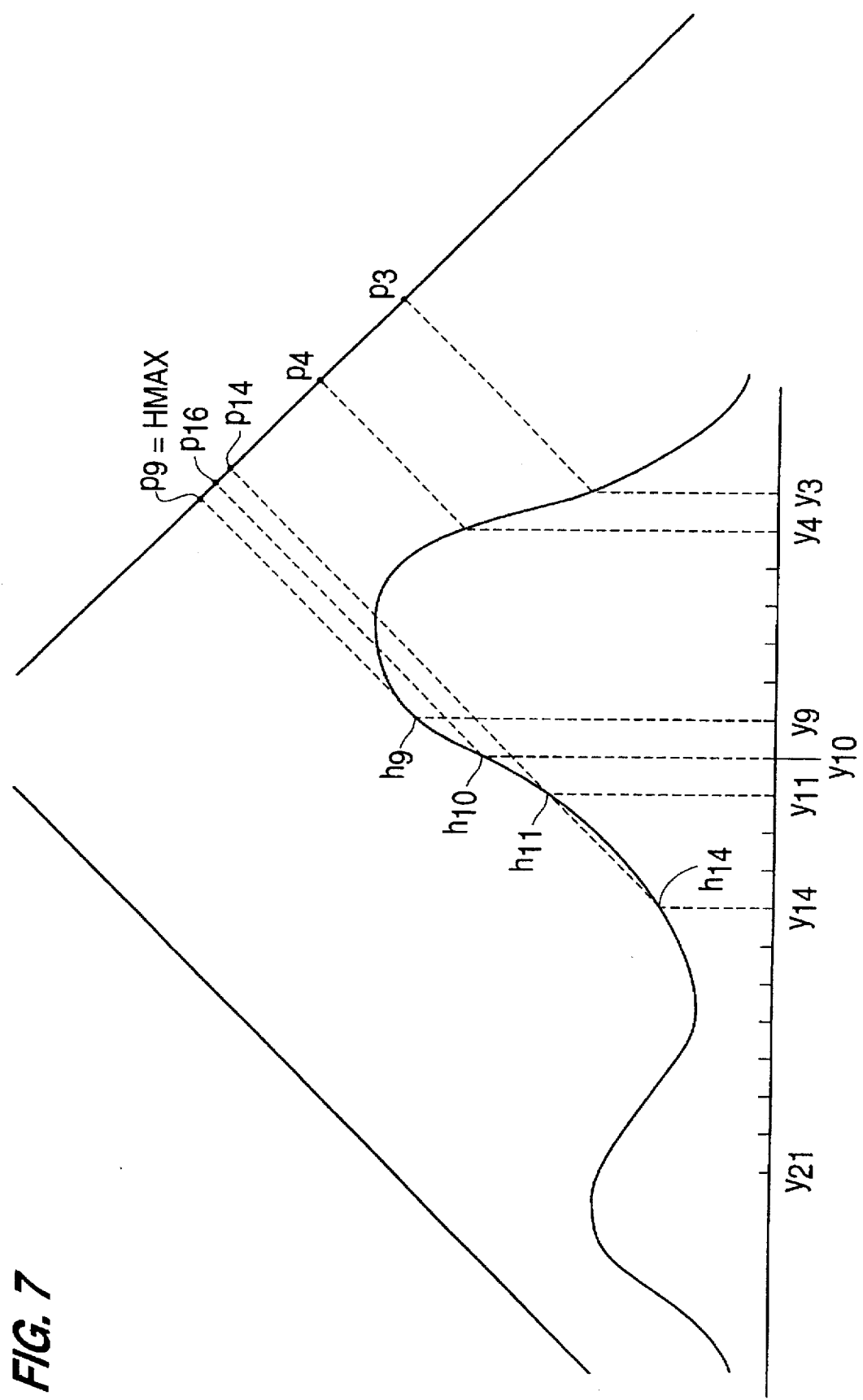
FIGS. 7-8 illustrate specific examples of how the system of the present invention handles the effect of a shadow cast by a tall object to the simulated SAR radar signal.

FIG. 7 illustrates the situation wherein a portion of the terrain being imaged is not illuminated by the radar signal and, therefore, does not produce any reflected signal to the SAR platform. To simulate this portion of the SAR image, no contribution of brightness from these portions of the terrain are accumulated in the accumulation register. To carry out this portion of the simulation, a maximum value HMAX for the projection in the illumination plane is determined. Whenever the projection in the illumination plane of the next point preceeding away from the origin on the Y axis is lower than this maximum value, then this point will be in the shadow and no brightness value will be projected for the terrain segment preceding this point. Thus, as shown in FIG. 7, the point $p_9$ projected from the terrain point $h_9$ becomes the maximum HMAX and the points $p_{10}$ through $p_{16}$ are all lower than the value of $p_9$. Accordingly, the terrain segment between $h_9$ and $h_{10}$, between $h_{10}$ and $h_{11}$, between $h_{11}$ and $h_{12}$, between $h_{12}$ and $h_{13}$, between $h_{13}$ and $h_{14}$, between $h_{14}$ and $h_{15}$, and between $h_{15}$ and $h_{16}$ will have no brightness values accumulated in accumulation register. In addition, the brightness accumulated in the accumulation register for the terrain segment bridging the distal edge of the shadow must be interpolated to prevent aliasing the image data at this edge of the shadow.

To make this interpolation, the calculation of the brightness value or values to be accumulated in the accumulation register is determined by projecting only the illuminated portion of the shadow bridging terrain segment into the image plane and calculating the brightness values to be accumulated on the basis of the overlap of this illuminated portion of the terrain segment.

Figure 8:
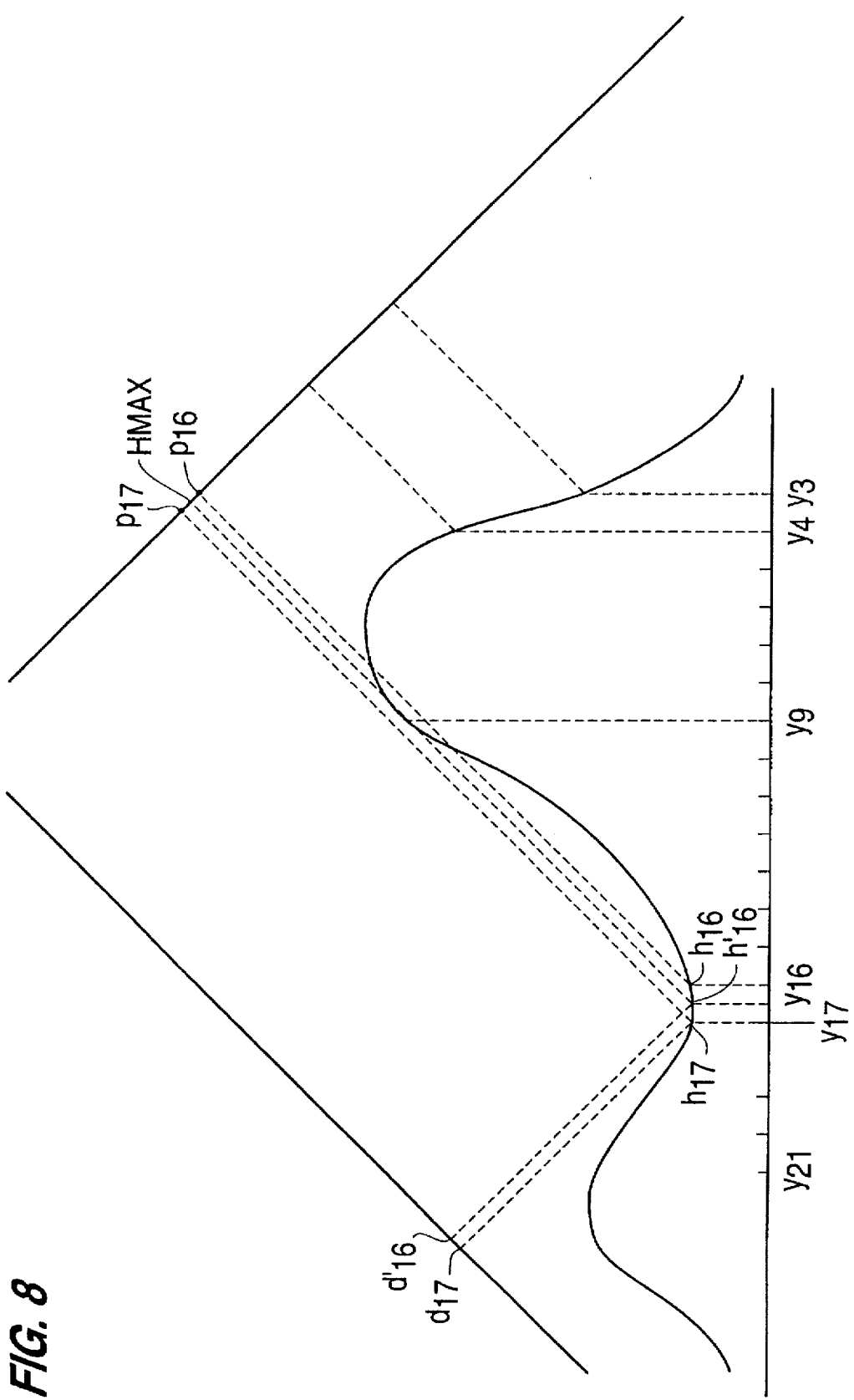

For example, as shown in FIG. 8, the terrain segment between $h_{16}$ and $h_{17}$ will lie partially in the shadow and be partially illuminated. The edge of the shadow will be at a point $h'_{16}$ which will project in the illumination plane at HMAX. Since the terrain is represented by incremental points, the point $h'_{16}$ will lie on a straight line extending between $h_{16}$ and $h_{17}$. To compute the brightness value or values to be accumulated in the accumulation register for the terrain segment between $h_{16}$ and $h_{17}$, the point $h'_{16}$ is projected into the image plane as point $d'_{16}$. In addition, the brightness of illumination of value S for the terrain segment bridging the distal edge of a shadow is adjusted to correspond to the difference between the projection in the illumination plane of the distal edge of the shadow and the distal edge of the terrain segment bridging the shadow edge. In FIG. 8, the brightness of illumination value S for the shadow edge bridging segment between $h_{16}$ and $h_{17}$ will be computed to be equal to $p_{17}$-HMAX. The brightness values to be accumulated are then determined in the same manner as described above by computing the overlap of the projected segment between $d'_{16}$ and $d_{17}$ and multiplying by the brightness of illumination S.

Figure 9:
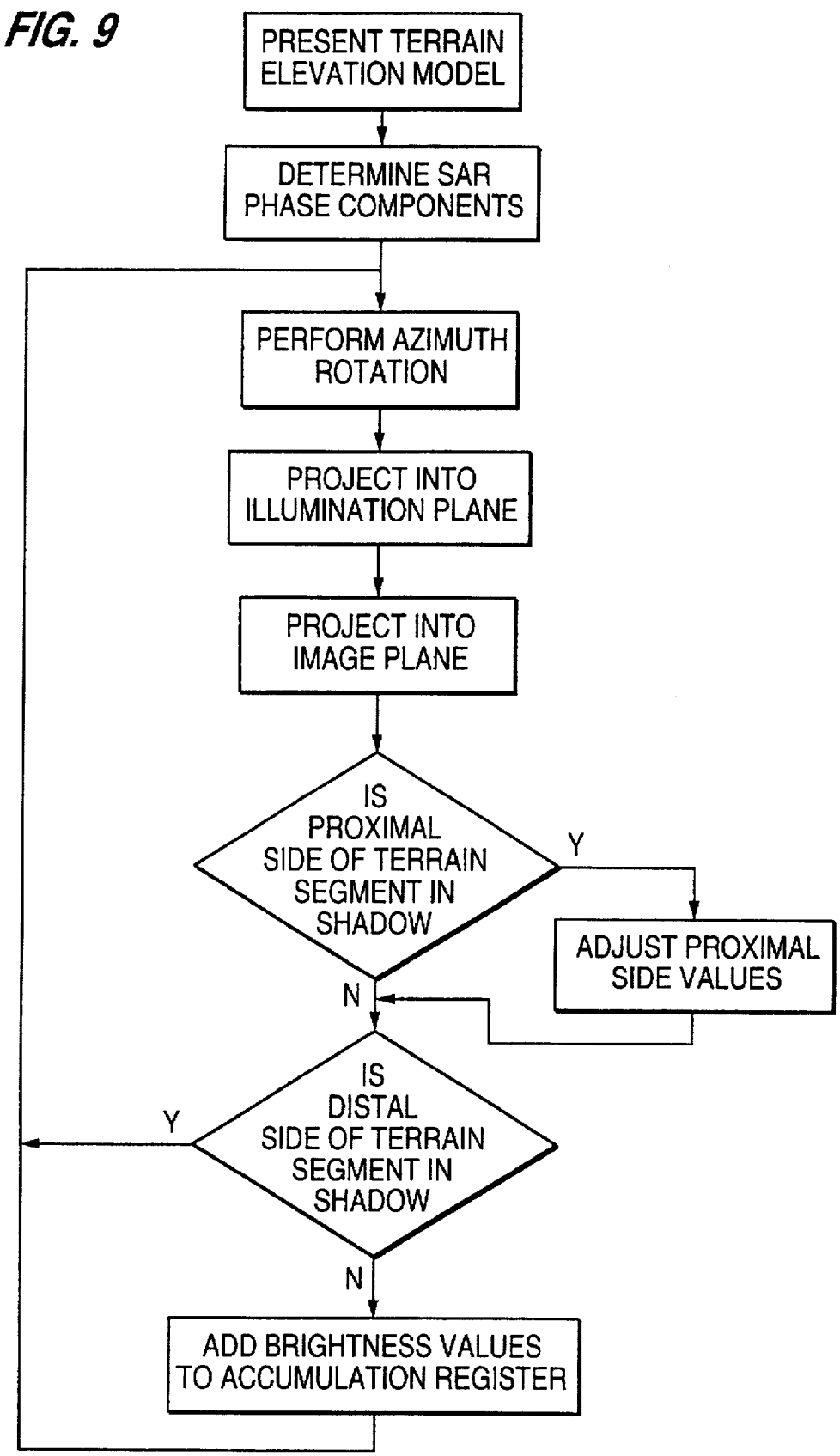
FIG. 9 is a flow chart illustrating the program used in the system of the present invention.

The flow chart for the computer program to simulate the SAR is represented in FIG. 9. The portion of the program to generate the brightness portion of SAR data is represented by the following listing in pseudo code:

```
100    (* Pseudocode for SAR image simulator *)
101    DO i = 1 TO NumColumns
102      LET HMAX = 0
103      LET ACC(i,k) = 0 for all j
104      LET FIRST = 1
105      DO j = 1 TO NumPointsInColumn
106        LET (a,b) = AZ(i,j)
107        IF (a,b) is off the surface, THEN GOTO 138
108        LET h1 = height of surface at the point (a,b)
109        LET p1 = y-component of EL(j,h1) (* illumination plane *)
110        LET d1 = y-component of TR(j,h1) (* image plane *)
111        IF FIRST = 1, THEN GOTO 134
112        IF p2 < HMAX THEN
113          LET e = (p1 - HMAX)/(p1 - p2)
114          LET h2 = e*h2 + (1 - e)*h1
115          LET j2 = e*j + (1 - e)*(j + 1)
116          LET d2 = y-component of TR(j2,h2)
117          LET p2 = HMAX
118        ENDIF
119        IF p1 < p2 THEN GOTO 134
120        LET q1 = MAX(d1,d2)
121        LET q2 = MIN(d1,d2)
122        LET m and n be the largest integers not exceeding q1 and q2
123        LET S = p1 - p2
124        IF m = n THEN
125          Add (q1 - q2)*S to ACC(i,m)
126        ELSE
127          Add (q1 - m)*S to ACC(i,m)
128          Add (1- (q2 - n))*S to ACC(i,n)
129          LET w = 1
130          DO h = n + 1 TO m - 1
131            Add S to ACC(i,h)
132          END DO
133        ENDIF
134        LET HMAX = MAX(p1, HMAX)
135        LET FIRST = 0
136        LET p2 = p1
137        LET d2 = d1
138        LET h2 = h1
139      END DO
140    END DO
```

As shown in FIG. 9, the first step of the process is to provide a terrain elevation model of the surface to the simulated. The terrain elevation comprises a digital value for each increment of surface on a XY grid representing the elevation of each increment. From this data, the program computes the phase portion of the complex signal that would be obtained by the SAR platform from the terrain represented by the terrain elevation model. This computation determines the distance from each terrain increment to the SAR platform modulo the radar signal wavelength. This phase data is stored in the phase component register 29. The program then enters the part of the program to determine the brightness portion of the SAR data represented by the above pseudo code listing. In the brightness component computation, the elevation values are subjected to azimuth rotation wherein the values are rotated about a vertical axis to align them with the direction of travel of the SAR platform relative to the digital elevation model. This process involves bilineal interpolation of the digital values to determine a new set of digital values spread over an XY terrain grid. This process is represented in line 106 of the pseudo code listing of the computer program. After the azimuth has been rotated, the terrain elevation points will represent terrain strips perpendicular to the assumed direction of travel of the SAR platform. The terrain elevation points are projected into the illumination plane (step 109 in the pseudo code) and then into the image plane (step 110 in pseudo code). In the pseudo code, h2 represents the terrain elevation on the proximal side of a terrain segment being simulated and h1 represents the terrain elevation of the distal side of a terrain segment. The projection of h1 and h2 to the illumination plane in the pseudo code is represented as p1 and p2 and the projection of h1 and h2 into the image plane is represented as d1 and d2. Following these projections, it is determined whether the proximal side of the terrain segment being processed is in the shadow of a tall terrain object. This determination is made in step 112 by determining whether or not the proximal side of terrain segment projected to the illumination plane, represented by p2 in the pseudo code, is less than the variable HMAX which is the highest value that the projections into the illumination plane have reached, as shown in FIG. 7. When the proximal point is less than the maximum value HMAX, the proximal side of the terrain segment being processed will be in the shadow. Accordingly, if it is determined that p2 is less than HMAX, then the proximal point elevation point h2 is in the shadow of a tall object so that it is not illuminated. If the point is in the shadow, the program executes a subroutine in steps 113 to 115 to determine the location of the distal edge of the shadow. This shadow edge is projected into the image plane in step 116 to be used in the calculation of the brightness values to be accumulated in the accumulation register when a terrain segment bridges the distal edge of the shadow as described with reference to FIG. 8. Next, the program determines whether or not the distal side of the terrain segment at h1 is in the shadow. This determination is made in step 119 in the pseudo code and is determined by whether or not the distal projected point p1 is less than HMAX. If so, then the distal side of the terrain segment is in the shadow. If the point h1 is in the shadow, the computer program returns to the steps 109 and 110 of projecting the points in the illumination and image planes to project to the next point in the sequence without storing any values in the accumulation register. If the distal side of the terrain segment is determined not to be in the shadow, then the program proceeds into the next step in which the interpolated values of the brightness are determined and are then added to the corresponding pixel storage locations in the accumulation array (steps 120 through 132). As shown in steps 120-132, the interpolated brightness values to be added into the corresponding pixels in the accumulation array are determined as follows: First the projected points in the image plane are rearranged in accordance with their location. Because of the shape of the terrain being projected, in some instances the projected position d1 in the image plane of the distal side of a terrain segment may be smaller, that is, closer to the platform than the projected position d2 of proximal side of terrain segment. Accordingly, as a first step in lines 120 and 121 of the pseudo code, these positions are rearranged in the order in order of magnitude as q1 and q2. In step 123, the value S which is the brightness of the illumination of the terrain segment being projected, is calculated by subtracting the projected position of point p2 from the projected position point p1 in the illumination plane. As explained above, the further apart the points are in the illumination plane, the brighter will be the illumination of the terrain segment between these points. Then, in step 124, it is determined whether or not the two points q1 and q2 fall into the same pixel area of the illumination plane. If they do, then the product of the brightness of illumination S times q1 minus q2 is then added to the storage location in the accumulation array corresponding to the pixel of the illumination plane into which the projected positions q1 and q2 fall. If the two projected points q1 and q2 do not fall in the same pixel, then the products of the brightness of illumination S times each length of projected terrain segment overlap are added to the accumulation array storage locations. The pixels in which the overlap occurs are those pixels in which the projected points q1 and q2 are found and these are the pixels to which the brightness values are added. These additions to the accumulation register take place in steps 127 and 128 in the pseudo code.

If there are any pixels in the illumination plane between the pixels in which the points q1 and q2 are projected, then the value S is added to these corresponding pixels in the accumulation array (line 131 of the pseudo code). Each strip of terrain being processed is calculated in successive loops through the pseudo code, the loops occurring from step 101 to step 141 and the successive terrain segments are processed and projected in a loop from steps 105 to 139.

In the above described method of calculating the brightness values for the accumulation array, for each given calculation, the brightness of illumination S was assumed to be the same at adjacent points. This approximation substantially simplifies the calculation required and does not substantially affect the resulting image. However, instead of making this assumption, the brightness of illumination value can be interpolated in accordance with the location of the projected strip relative to the location on the terrain from which the brightness values are determined. This more precise technique of interpolating the brightness product to be accumulated into the accumulation register is fully described in the text by Hearn and Baker entitled "Computer Graphics", referred to above.

Figure 10:
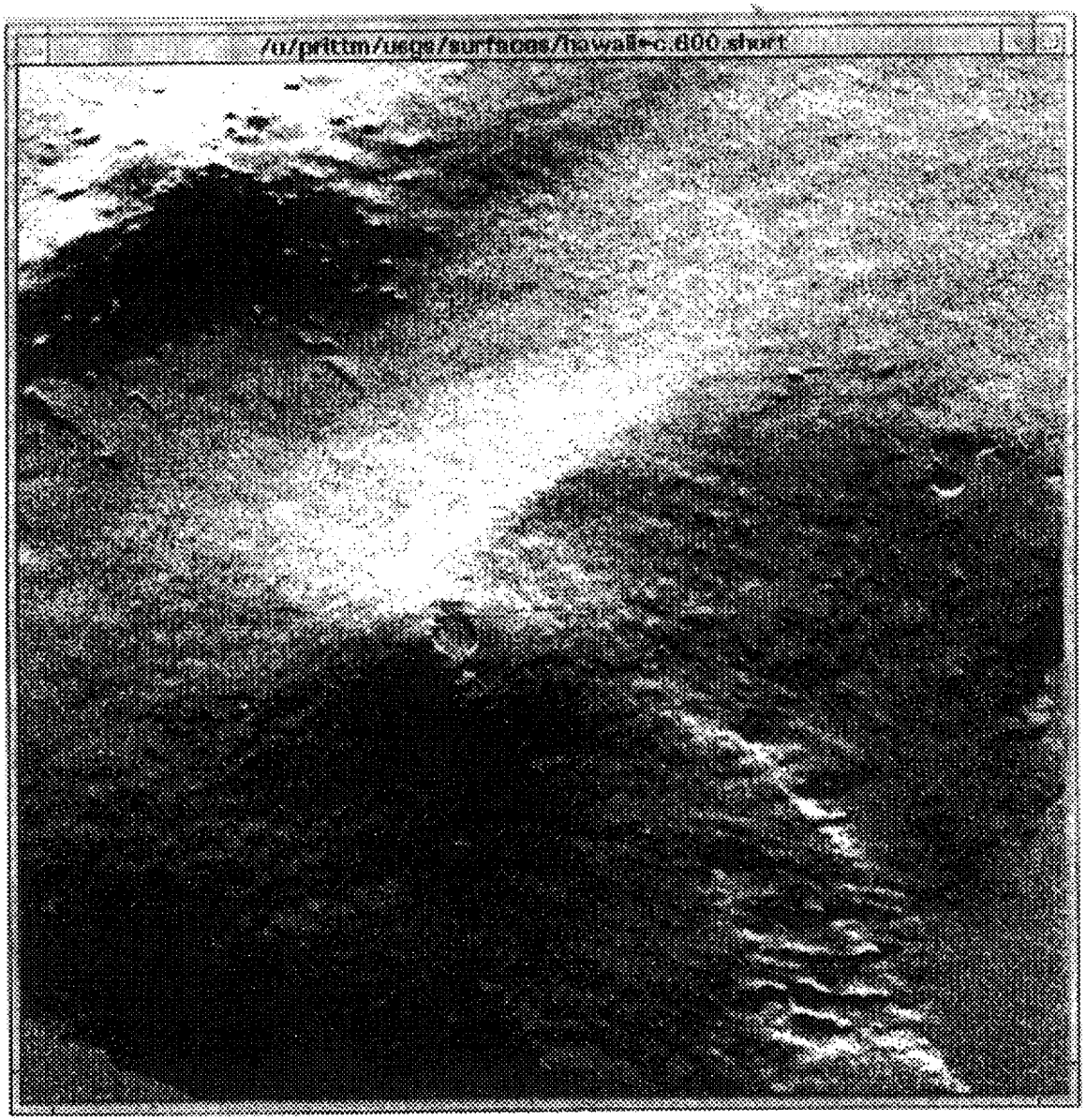
FIG. 10 is a simulated SAR image made by the system of the present invention.

The system described above provides an excellent simulation of the data that could be produced by an SAR platform. FIG. 10 illustrates a simulated SAR image made from a USGS terrain model from Hawaii made by the system of the present invention.

The above description has been described without incorporation of a squint angle. The squint may be incorporated if desired with an appropriate rotation of the planes to thus enable the algorithm to simulate a spotlight mode as well as a strip map mode of SAR images.

The above description is of a preferred embodiment of the invention and modification may be made thereto without departing from the spirit and scope of the invention which is defined in the appended claims.

I claim:

1. A method of simulating a synthetic aperture radar comprising defining terrain strips corresponding to radar signals received from a simulated SAR platform, representing in a memory of a computer terrain elevations distributed at regular intervals along said terrain strips wherein said terrain strips are divided into terrain segments between points of terrain elevation, determining with said computer where said points of terrain elevation project into an illumination plane perpendicular to the direction of a simulated SAR radar signal transmitted by said simulated SAR platform, determining with said computer where said elevation points project into an image plane perpendicular to said illumination plane thereby determining the projection of said terrain segments into said image plane, determining with said computer a brightness of illumination value for terrain segments extending between said terrain elevation points corresponding to the separation of the corresponding points projected into said illumination plane, dividing said image plane into incremental pixel areas, providing an accumulation register having storage locations corresponding to the incremental pixel areas of said image plane, adding brightness values to the storage locations of said accumulation register wherein each brightness value accumulated in a given storage location corresponds to a terrain strip and is determined from the product of the brightness of illumination of such terrain strip times the amount that the projection of such terrain strip overlaps the incremental pixel area of said image plane corresponding to such storage location.

2. A method as recited in claim 1, further comprising determining data corresponding to the phase component of said simulated SAR signal.

3. A method as recited in claim 2, further comprising determining from said points projected into said illumination plane which terrain segments lie in a shadow so as not to be illuminated by said simulated SAR signal and accumulating no values in said accumulation register corresponding to terrain segments lying wholly within such shadow.

4. A method as recited in claim 1, further comprising adjusting the brightness value for any terrain strip bridging the edge of a shadow distal from said simulated platform in accordance with the amount of such terrain segment illuminated by said transmitted SAR signal.

5. A method as recited in claim 1, further comprising adjusting the projection of a terrain strip bridging the distal edge of a shadow into said illumination plane to correspond with the illuminated portion of such terrain strip bridging the distal edge of a shadow.

6. A method as recited in claim 1, further comprising presenting a terrain elevation model of the terrain to be simulated and rotating said terrain elevation model about a vertical axis to produce terrain elevations distributed along said terrain strips.

7. An apparatus for simulating a synthetic aperture radar system comprising means for storing a terrain elevation model, a pixel based accumulation register having storage locations corresponding to incremental pixel areas of an image plane arranged parallel to a simulated transmitted and reflected SAR signal, a central processing unit programmed to respond to said terrain elevation model to project terrain elevation points distributed along terrain strips of the terrain represented by said terrain elevation model into an illumination plane perpendicular to said transmitted and reflected simulated SAR signal, to project said terrain elevation points into said image plane to define in said image plane projections of terrain segments extending between said elevation points, to determine brightness of illumination values from the separation of the points projected into said illumination plane, and to accumulate brightness values corresponding to said terrain segments in storage locations of said accumulation register corresponding to incremental pixel areas of said image plane, the brightness values accumulated in each storage location corresponding to the product of the brightness of illumination of the corresponding terrain strip times the amount that the corresponding projected terrain strip overlaps the corresponding incremental pixel area of said image plane.

* * * * *